(12) United States Patent
Liu et al.

(10) Patent No.: US 12,486,487 B2
(45) Date of Patent: Dec. 2, 2025

(54) METHOD FOR PRODUCING A VIRUS AND A HARVESTING SOLUTION COMPOSITION

(71) Applicant: HANGZHOU CONVERD CO., LTD., Zhejiang (CN)

(72) Inventors: Yunfan Liu, Zhejiang (CN); Wenbo Wang, Zhejiang (CN); Liming Zhang, Zhejiang (CN); Qian Chen, Zhejiang (CN); Sanmao Kang, Zhejiang (CN)

(73) Assignee: HANGZHOU CONVERD CO., LTD., Zhejiang (CN)

( * ) Notice: Subject to any disclaimer, the term of this patent is extended or adjusted under 35 U.S.C. 154(b) by 1018 days.

(21) Appl. No.: 17/596,732

(22) PCT Filed: Jun. 24, 2020

(86) PCT No.: PCT/CN2020/097901
§ 371 (c)(1),
(2) Date: Dec. 16, 2021

(87) PCT Pub. No.: WO2020/259532
PCT Pub. Date: Dec. 30, 2020

(65) Prior Publication Data
US 2022/0267713 A1    Aug. 25, 2022

(30) Foreign Application Priority Data

Jun. 28, 2019    (CN) .......................... 201910574886.3

(51) Int. Cl.
*C12N 1/06*    (2006.01)
*C12N 7/00*    (2006.01)

(52) U.S. Cl.
CPC ................. *C12N 1/06* (2013.01); *C12N 7/00* (2013.01); *C12N 2710/24121* (2013.01); *C12N 2710/24151* (2013.01)

(58) Field of Classification Search
CPC .. C12N 1/06; C12N 7/00; C12N 2710/24121; C12N 2710/24151
See application file for complete search history.

(56) References Cited

U.S. PATENT DOCUMENTS

| | | | |
|---|---|---|---|
| 2008/0138354 A1 | 6/2008 | Zaia et al. | |
| 2011/0165645 A1 | 7/2011 | Xiong | |
| 2018/0346881 A1* | 12/2018 | Clemens | C12N 5/0682 |
| 2019/0030188 A1 | 1/2019 | Hetz Flores et al. | |
| 2021/0268405 A1* | 9/2021 | Xu | C12N 7/02 |

FOREIGN PATENT DOCUMENTS

| | | | | |
|---|---|---|---|---|
| CN | 1490050 A | * | 4/2004 | |
| CN | 1582333 A | * | 2/2005 | A61K 39/12 |
| CN | 102191225 A | | 9/2011 | |
| CN | 102257134 A | | 11/2011 | |
| CN | 103602639 A | * | 2/2014 | |
| CN | 103614346 A | * | 3/2014 | |
| CN | 103952376 A | | 7/2014 | |
| EP | 1586634 B1 | * | 5/2008 | C12N 7/00 |
| JP | 2010515459 A | * | 5/2010 | |
| JP | 2012526531 A | * | 11/2012 | |
| JP | 2014521353 A | * | 8/2014 | |
| WO | 1999007852 A1 | | 2/1999 | |
| WO | 02/24876 A2 | | 3/2002 | |
| WO | 02/024876 A3 | | 3/2002 | |
| WO | 03/050275 A2 | | 6/2003 | |
| WO | 2012/010280 A1 | | 1/2012 | |
| WO | 2016/201224 A1 | | 12/2016 | |
| WO | 2003/050275 A3 | | 6/2023 | |

OTHER PUBLICATIONS

JP 2010515459 A.. 2010. Machine translation. (Year: 2010).*
JP 2012526531 A. 2012. Machine translation (Year: 2012).*
JP 2014521353 A. 2014. Machine translation. (Year: 2014).*
CN 1582333 A. Katinger et al., 2005. Machine translation. (Year: 2005).*
CN 1490050 A. Chen et al., 2004. Machine translation. (Year: 2004).*
CN 103614346 A. Zhang et al., 2014. Machine translation. (Year: 2014).*
CN 103602639 A. Huang et al., 2014. Machine translation. (Year: 2014).*
Cheng Shipeng et al.; General Data Manual for Special economic animals; Liaoning Science and Technology Press; Oct. 31, 2000; p. 241.
Wang Huan et al.; Recombinant Vaccinia virus with hepatitis B surface antigen gene—a possible live hepatitis B vaccine; Science in China Series B; Jun. 30, 1986; pp. 623-634; No. 6.
Vaccines; Biotechnology Bulletin; Dec. 31, 1993; pp. 40-42.
Extended European Search Report for corresponding application No. EU2083260.7 dated Jul. 13, 2023.
Journal of General Virology (2003), vol. 84, No. 6, pp. 1383-1392, Meiser, et al. "Comparison of virus production in chicken embryo fibroblasts infected with the WR, IHD-J and MVA strains of vaccinia virus: IHD-J is most efficient in trans-Golgi network wrapping and extracellular enveloped virus release".
Molecular Therapy, Elsevier Inc, US, vol. 14, No. 6, pp. 809-821, "Proteolytic Mapping of the Adeno-associated Virus Capsid", Vliet, et al.

(Continued)

*Primary Examiner* — Janet L Andres
*Assistant Examiner* — Carey Alexander Stuart
(74) *Attorney, Agent, or Firm* — Renner, Otto, Boisselle & Sklar, LLP (57) ABSTRACT

The present invention provides a method for producing a virus and a harvesting solution composition. The method includes culturing cells, wherein the cells have been inoculated with viruses or have been transfected with viral packaging elements; and contacting the cultured cells with a harvesting solution composition to harvest the viruses in a single step, wherein the harvesting solution composition comprises a trypsin, a pH buffer, and, optionally, a nuclease, and wherein the pH of the harvesting solution composition is greater than 7.5 and no more than 10.5. The virus production method of the present invention has advantages of simple operation, easy scale-up, stable yield and so on, and the yield is unexpectedly and significantly improved compared to the prior art, and it can ensure the integrity of the viral particles without damaging the biological activity of the viruses. Therefore, it is very suitable for large-scale production of viruses.

20 Claims, 1 Drawing Sheet

(Continued)

(56) References Cited

OTHER PUBLICATIONS

Trypsin/EDTA Solution, 100 ml, Jun. 30, 2023, Retrieved from the Internet: URL: https:/ /bioscience. lonza.com/lonza_bs/DE/en/Primary-and-Stem-Cells/p/000000000000185413/Trypsin-EDTA-Solution%2C-100-mL#.
International Search Report mailed Oct. 12, 2020, for priority International Patent Application No. PCT/CN2020/097901.
Kazuya Shirato et al.; Role of Proteases in Release of Porcine Epidemic Diarrhea Virus from Infected Cells; J Virol., vol. 85, No. 15; Aug. 31, 2011.
Benzonase Nuclease; Effective removal of nucleic acids and viscosity reduction from protein solutions; Merck Novagen-Calbiochem Biosciences; 2008; pp. 1-16.
Takashi Nubori et al.; Immobilization of Trypsin at the Microcapsule Surface and Enzymatic Activity of the Immobilized Trypsin; Special Articles on Functional Thin Films; The Chemical Society of Japan; 1983; No. 6; pp. 807-811; Abstract.

* cited by examiner

METHOD FOR PRODUCING A VIRUS AND A HARVESTING SOLUTION COMPOSITION

This application is a national phase of International Application No. PCT/CN2020/097901 filed Jun. 24, 2020, which claims priority to Chinese Application No. 201910574886.3 filed Jun. 28, 2019, the entire disclosures of which are hereby incorporated by reference.

FIELD OF THE INVENTION

The present invention relates to the field of biotechnology, in particular, to a method for producing a virus and a harvesting solution composition. More specifically, the present invention relates to a method for producing a virus by culturing cells, and a harvesting solution composition for harvesting viruses subjected to cell culture.

BACKGROUND OF THE INVENTION

The preparation of viral biological products, such as oncolytic virus drugs, viral vaccines or recombinant viral vectors or the like, generally includes: inoculating the viruses on uninfected cells of suitable generation, harvesting the infected cells when they exhibiting a certain degree of cytopathy, lysing the cells in different ways and harvesting the viruses, and then purifying the viruses by density gradient centrifugation or chromatography to obtain a virus stock solution, adding an amount of buffer to obtain a semi-finished product, and the semi-finished product is lyophilized or aliquoted to obtain a finished product.

At present, the large-scale cultivation of cells for the production of viral biological products mainly adopts cell factories or fermenters. Most of the amplified viruses are inside the cells. Therefore, in the viral harvesting process, it is necessary to effectively break and lyse the cells to release the viruses and ensure the integrity of the viral particles. However, different harvesting processes have different influence on the lysis of cells and the integrity of viral particles. The harvesting method directly influences the virus titer and the effective high titer value of the harvested virus stock solution is an important factor influencing the quality of the finished product.

Since vaccinia virus, herpes simplex virus, varicella-zoster virus and adenovirus belong to intracellular virus which have strong cell binding activity, the cells must be collected and lysed during the harvest of the viruses in order to obtain free viral particles. At present, for the recombinant virus vectors based on lentivirus, retrovirus, and adenovirus-associated virus, only free viruses outside the cells are harvested in the practical process of package and production, and a large amount of intracellular viruses are not fully utilized.

Presently, in the large-scale production for these viruses, the freeze-thaw method is used to lyse cells to harvest intracellular viruses. However, the freeze-thaw method has the disadvantages of high energy consumption, long period, multiple steps, difficult scale-up and unstable yield, which limit the production scale of viral biological products. There is also a hypotonic method or chemical lysis method to harvest intracellular viruses, wherein a large number of viruses bound to the cell membrane are not fully released and many chemical lysis reagents destroy the envelope of enveloped virus (such as vaccinia viruses, herpes simplex viruses, etc.), making the virus lose biological activity.

Therefore, there is still a need for a method that can efficiently produce viruses by cell culture and a harvesting solution that can effectively harvest viruses subjected to cell culture. This is essential for obtaining products such as high-quality viral vaccines and recombinant virus vectors.

SUMMARY OF THE INVENTION

In order to solve one or more of the above-mentioned problems in the prior art, the present invention provides a method for producing a virus and a harvesting solution composition.

Specifically, the present invention provides:

(1) A method of producing a virus, comprising:
culturing cells, wherein the cells have been inoculated with viruses or have been transfected with viral packaging elements; and
contacting the cultured cells with a harvesting solution composition to harvest the viruses in a single step, wherein the harvesting solution composition comprises a trypsin, a pH buffer, and, optionally, a nuclease, and wherein the pH of the harvesting solution composition is in the range of greater than 7.5 and no more than 10.5.

(2) The method according to (1), wherein the concentration of the trypsin in the harvesting solution composition is in the range of 0.01-0.12% (w/v), preferably in the range of 0.03-0.06% (w/v).

(3) The method according to (1) or (2), wherein the concentration of the nuclease in the harvesting solution composition is in the range of 1-100 IU/ml, preferably in the range of 1-50 IU/ml, and more preferably in the range of 1-5 IU/ml.

(4) The method according to any one of (1) to (3), wherein the osmotic pressure of the harvesting solution composition is in the range of 0-50 mOsmol/kg or 800-2500 mOsmol/kg, preferably in the range of 0-20 mOsmol/kg or 1785-2000 mOsmol/kg, and more preferably in the range of 1-20 mOsmol/kg.

(5) The method according to any one of (1) to (4), wherein the pH of the harvesting solution composition is in the range of 8.5-9.5.

(6) The method according to any one of (1) to (5), wherein the pH buffer is selected from a Tris buffer and a sodium bicarbonate buffer.

(7) The method according to any one of (1) to (6), wherein the culture is carried out in a cell flask, a cell factory or a fermentor, and the culture includes adherent culture and suspension culture.

(8) The method according to any one of (1) to (7), wherein when the culture is an adherent culture, the amount of the harvesting solution composition is in the range of greater than or equal to 35 µl of the harvesting solution composition/$cm^2$ cells, preferably in the range of greater than or equal to 70 µl of the harvesting solution composition/$cm^2$ cells; or wherein when the culture is a suspension culture, the amount of the harvesting solution composition is in the range of greater than or equal to 35 µl of the harvesting solution composition/$10^5$ cells, preferably in the range of greater than or equal to 70 µl of the harvesting solution composition/$10^5$ cells.

(9) The method according to any one of (1) to (8), wherein contacting the cultured cells with the harvesting solution composition for a time range of 5-60 minutes.

(10) The method according to any one of (1) to (9), wherein the cells are selected from Vero cells, 293 cells, CEF cells, and Hela cells.

(11) The method according to any one of (1) to (10), wherein the virus comprises vaccinia virus, varicella-zoster virus, rotavirus, EV71 virus, hepatitis A virus, herpes simplex virus, lentivirus, retrovirus, adenovirus, adenovirus-associated virus, measles virus, Semliki Forest virus, vesicular stomatitis virus, poliovirus, reovirus, vesicular stomatitis virus, poliovirus, Seneca valley virus, Echo enterovirus, Coxsackie virus, Newcastle disease virus and Maraba virus, and preferably enveloped virus.

(12) The method according to any one of (1) to (11), wherein the cells are 293 cells, and the viruses are vaccinia viruses.

(13) The method according to any one of (1)-(5) and (7)-(12), wherein the harvesting solution composition comprises a Tris buffer, a trypsin and a nuclease, and the concentration of the Tris buffer is in the range of 1-50 mM, and preferably in the range of 1-10 mM.

(14) A harvesting solution composition for harvesting viruses subjected to cell culture, wherein the harvesting solution composition comprises a trypsin, a pH buffer, and, optionally, a nuclease, and wherein the pH of the harvesting solution composition is in the range of greater than 7.5 and no more than 10.5.

(15) The harvesting solution composition according to (14), wherein the concentration of the trypsin in the harvesting solution composition is in the range of 0.01-0.12% (w/v), preferably in the range of 0.03-0.06% (w/v).

(16) The harvesting solution composition according to (14) or (15), wherein the concentration of the nuclease in the harvesting solution composition is in the range of 1-100 IU/ml, preferably in the range of 1-50 IU/ml, and more preferably in the range of 1-5 IU/ml.

(17) The harvesting solution composition according to any one of (14) to (16), wherein the osmotic pressure of the harvesting solution composition is in the range of 0-50 mOsmol/kg or 800-2500 mOsmol/kg, preferably in the range of 0-20 mOsmol/kg or 1785-2000 mOsmol/kg, and more preferably in the range of 1-20 mOsmol/kg.

(18) The harvesting solution composition according to any one of (14) to (17), wherein the pH of the harvesting solution composition is in the range of 8.5-9.5.

(19) The harvesting solution composition according to any one of (14) to (18), wherein the pH buffer is selected from a Tris buffer and a sodium bicarbonate buffer.

(20) The harvesting solution composition according to any one of (14) to (19), wherein the culture is carried out in a cell flask, a cell factory or a fermentor, and the culture includes adherent culture and suspension culture.

(21) The harvesting solution composition according to any one of (14) to (20), wherein the cells are selected from Vero cells, 293 cells, CEF cells, and Hela cells.

(22) The harvesting solution composition according to any one of (14) to (21), wherein the virus comprises vaccinia virus, varicella-zoster virus, rotavirus, EV71 virus, hepatitis A virus, herpes simplex virus, lentivirus, retrovirus, adenovirus, adenovirus-associated virus, measles virus, Semliki Forest virus, vesicular stomatitis virus, poliovirus, reovirus, vesicular stomatitis virus, poliovirus, Seneca valley virus, Echo enterovirus, Coxsackie virus, Newcastle disease virus and Maraba virus, and preferably enveloped virus.

(23) The harvesting solution composition according to any one of (14) to (22), wherein the cells are 293 cells, and the viruses are vaccinia viruses.

(24) The harvesting solution composition according to any one of (14)-(18) and (20)-(23), wherein the harvesting solution composition comprises a Tris buffer, trypsin, and nuclease, and the concentration of the Tris buffer is in the range of 1-50 mM, and preferably in the range of 1-10 mM.

Compared to the prior art, the present invention has the following advantages and positive effects:

The present invention first proposes a single-step harvesting method for the production of a virus, such that in the virus production method of the present invention, the viruses can be harvested in a single step by contacting the cultured cells with the harvesting solution composition of the present invention. The inventors of the present invention obtained the harvesting solution composition according to the present invention through extensive researches and the harvesting solution composition can completely lyse the cells to harvest the viruses without the need of other cell lysis methods or steps such as freeze-thaw, ultrasound, mechanical disruption and the like. The virus production method of the present invention has the advantages of simple operation, easy scale-up, stable yield, etc., and the yield is unexpectedly and significantly improved compared to the prior art. Furthermore, it can ensure the integrity of viral particles without damaging the biological activity of the viruses. Therefore, it is very suitable for large-scale production of viruses.

In a large-scale production, by using the method and the harvesting solution composition of the present invention, the producing process can be greatly simplified, the production cost can be reduced and a high-activity viral product can be obtained with high-concentration and high-purity.

DETAILED DESCRIPTION OF THE PREFERRED EMBODIMENTS

The present invention will be further explained through the description of specific embodiments and with reference to the accompanying drawings, but they are not a limitation of the present invention. Those skilled in the art can make various modifications or improvements based on the basic ideas of the present invention, which are intended to be within the scope of the present invention as long as they do not deviate from the basic ideas of the present invention.

The virus production method of the present invention includes: culturing cells, wherein the cells are cells that have been inoculated with viruses or transfected with virus packaging elements; and contacting the cultured cells with the harvesting solution composition of the present invention to harvest the viruses in a single step. The harvesting solution composition of the present invention comprises a trypsin, a pH buffer and optionally a nuclease, and the pH of the harvesting solution composition is in a range of greater than 7.5 and no more than 10.5.

The "viral packaging element" as used herein refers to a cis-acting element and a trans-acting element required by the recombinant viral vector for packaging lentivirus, retrovirus, adenovirus-associated virus, etc.

The "harvest the viruses in a single step" as used herein means that when the cultured cells are in contact with the harvesting solution composition of the present invention, the harvesting solution composition can completely lyse the cells to harvest the viruses without the need to perform other cell lysis methods or steps such as freeze-thaw, ultrasound, mechanical disruption and the like.

The inventors of the present invention found that the purpose of harvesting the viruses in a single step cannot be achieved and the virus yield is still low if the hypotonic buffer of the prior art is used merely. The inventors of the present invention unexpectedly found that when the harvesting solution composition of the present invention is used, the viruses can be harvested in a single step and the virus yield is improved significantly. Compared to the methods of the prior art, the virus yield obtained by the present invention can be increased by more than 5 times.

In the harvesting solution composition, the concentration of the trypsin may be in the range of 0.01-0.12% (% is the mass-volume ratio (w/v), that is, the grams of trypsin contained in 100 ml of the harvesting solution composition is 0.01-0.12 g), such as 0.03, 0.05, 0.07, 0.09, 0.11% (w/v), and preferably in the range of 0.03-0.06% (w/v). The trypsin may be commercially available and may be traditional trypsin derived from animals or recombinant trypsin.

In the harvesting solution composition, if the nuclease is included, the concentration of the nuclease may be in the range of 1-100 IU/ml, such as 1, 3, 5, 10, 20, 40, 60, 80 IU/ml, preferably in the range of 1-50 IU/ml, and more preferably in the range of 1-5 IU/ml. A certain concentration of $Mg^{2+}$ (such as 1-10 mM $Mg^{2+}$, preferably 1-2 mM $Mg^{2+}$; for example, 1 mM $MgCl_2$) can be added to make the nuclease work.

The osmotic pressure of the harvesting solution composition can be in the range of 0-50 mOsmol/kg (for example, 1, 5, 10, 15, 30, 45 mOsmol/kg) or 800-2500 mOsmol/kg (for example, 1000, 1250, 1500, 1700, 1900, 2100, 2300 mOsmol/kg). Preferably, the osmotic pressure of the harvesting solution composition is in the range of 0-20 mOsmol/kg or 1785-2000 mOsmol/kg, more preferably in the range of 1-20 mOsmol/kg, and further preferably in the range of 1-10 mOsmol/kg.

The pH of the harvesting solution composition is alkaline, more specifically greater than 7.5 and not more than 10.5, such as 7.6, 8.0, 8.5, 9.0, 9.5, 10.0, 10.5, preferably 8.5-9.5. When the pH of the harvesting solution composition is less than or equal to 7.5, the cell cannot be lysed completely and the virus yield is low; when the pH of the harvesting solution composition is greater than 10.5, the viral activity will be influenced.

The pH buffer of the harvesting solution composition can be selected from a Tris buffer and a sodium bicarbonate buffer; preferably the Tris buffer.

In one embodiment, the harvesting solution composition of the present invention comprises a Tris buffer, a trypsin, and a nuclease. The concentration of the Tris buffer can be 1-50 mM, for example, 1, 3, 5, 8, 10, 20, 30, 40 mM, and preferably 1-10 mM.

In the method of the present invention, when the cells are cultured by adherent culture, the amount of the harvesting solution composition can be greater than or equal to 35 μl of the harvesting solution composition/$cm^2$ cells, and preferably greater than or equal to 70 μl of the harvesting solution composition/$cm^2$ cells, for example, 75, 100, 125, 150, 200 μl of the harvesting solution composition/$cm^2$ cells. Herein, the term "square centimeter cells ($cm^2$ cells)" refers to the sum of all adherent cells grown on one square centimeter. When the cells are cultured by suspension culture, the amount of the harvesting solution composition can be greater than or equal to 35 μl of the harvesting solution composition/$10^5$ cells, preferably greater than or equal to 70 μl of the harvesting solution composition/$10^5$ cells, such as 75, 100, 125, 150, 200 μl of the harvesting solution composition/$10^5$ cells.

In the present invention, the contact period of the cultured cells with the harvesting solution composition is generally no more than 60 minutes and the cells can be completely lysed within the contact period of 5-60 minutes (for example, 10, 20, 30, 40, 50 minutes) in general. The lysis of the cells can be observed by a microscope. When no intact cell is observed under the microscope, the cells are deemed to be lysed completely.

In the present invention, the inoculation of the virus or package of the virus, and cell culture can be carried out in the usual manner in the art. The amount of the virus inoculation can be 0.001-0.2 MOI, for example, 0.005, 0.01, 0.02, 0.03, 0.05, 0.08, 0.1, 0.15 MOI. As used herein, the term "MOI" or "multiplicity of infection" is the ratio between the number of viruses and the number of cells and refers to the number of viruses infected per cell, that initiates the viral infection. MOI=pfu/cell, that is, the number of cells×MOI=total PFU.

In the present invention, cell culture can be carried out, for example, in a cell flask (the scale can be 25-225 $cm^2$ cells/flask), a cell factory (the scale can be 500-800 $cm^2$ cells/layer, for example, 632 $cm^2$ cells/layer) or a fermentor (the scale can be 0.5-500 $m^2$ cells/fermentor), and the culture includes adherent culture and suspension culture. The medium can be those commonly used in the art, such as DMEM and MEM medium. The method of the present invention may further include the step of separating the cultured cells from the medium before contacting the cultured cells with the harvesting solution composition. In addition, the harvested viruses can be further purified by means of tangential flow centrifugation and/or column chromatography.

Cells that can be used in the present invention include (but are not limited to): Vero cells, 293 cells, CEF cells (i.e., chicken embryo fibroblasts) and Hela cells.

The Vero cell line was established from the kidney of normal adult African green monkey by Y. Yasumura and Y. Kawakita of Chiba University (Japan). This cell is anchorage-dependent fibroblast and can support the proliferation of a variety of viruses, including the virus such as herpes simplex virus, vaccinia virus, Japanese encephalitis virus, poliovirus, rabies virus, etc. WHO believes that Vero cells are safe to use within 150 generations, which are non-tumorigenic and have been approved for the production of viral vaccine for human.

293 cell line is a human embryonic kidney hypotriploid cell line containing the E1 region of adenovirus type 5 (Ad5) by transformed with 75 strain of Ad5 and it is a cell line complementary to the defect of the E1 region. It was constructed by F. L. Graham and J. S. Miley of McMaster University of Canada using DNA transfection technology in 1976. There are many derivative strains of 293 cells, such as HEK293, Ad293, 293T/17, AAV-293 and so on. The 293 cell line is widely used for the production of adenovirus, retrovirus, lentivirus, vaccinia virus, gene expression and protein expression.

Chicken embryo cell is the earliest object to be used in tissue culture. Tissue culture researchers have performed a lot of research work with chicken embryos. Chicken embryo fibroblasts (CEF) can be obtained conveniently and simply prepared, have good tolerance, and are suitable for the growth and reproduction of many viruses. Therefore, they are widely used in the production of vaccines, the cultivation of viruses, and the research in cell and molecular biology (For example, see the reference: Meiser A., et al., Comparison of virus production in chicken embryo fibroblasts infected with the WR, IHD-J and MVA strains of vaccinia virus: IHD-J is most efficient in trans-Golgi network wrapping and extracellular enveloped virus release. J Gen Virol, 2003, 84 (Pt 6): p. 1383-92).

HeLa cell is the first aneuploid epithelioid cell line obtained from human tissue through continuous culture. It was established by G. O. Gey et al. from cervical cancer tissue of a 31-year-old black woman in 1951. Compared with other cancer cell lines, this cell line proliferates extremely rapidly and is sensitive to poliovirus, adenovirus, vaccinia virus, etc., and shows obvious cell degeneration, which has great value in virus research and production. It is also widely used in tumor research, biological experiments, cell culture, etc.

Viruses that can be produced by the present invention include (but are not limited to): vaccinia virus, varicella-zoster virus, rotavirus, EV71 virus, hepatitis A virus, herpes simplex virus, lentivirus, retrovirus, adenovirus, adenovirus-associated virus, measles virus, Semliki Forest virus, vesicular stomatitis virus, poliovirus, reovirus, vesicular stomatitis virus, poliovirus, Seneca Valley Virus, Echo enterovirus, Coxsackie virus, Newcastle disease virus and Maraba virus, and enveloped virus is preferred. For example, enveloped virus includes vaccinia virus, varicella-zoster virus, rotavirus, EV71 virus, Coxsackie virus (CA16 virus), hepatitis A virus, herpes simplex virus, lentivirus, and retrovirus.

Viruses that can be produced by the present invention include oncolytic viruses, which can selectively replicate in tumor cells. The oncolytic viruses of the present invention include genetically mutated viruses with oncolytic effects and wild-type viruses with oncolytic effects. The genetically mutated viruses with oncolytic effects include (but are not limited to): adenovirus, poxvirus (also known as vaccinia virus), herpes simplex virus (HSV), measles virus, Semliki Forest virus, vesicular stomatitis virus, poliovirus and retrovirus; said wild-type viruses with oncolytic effects include (but are not limited to): reovirus, vesicular stomatitis virus, poliovirus, Seneca Valley Virus, Echo enterovirus, Coxsackie virus, Newcastle disease virus and Maraba virus. Exogenous genes can be integrated into the genomes of said oncolytic viruses and the exogenous genes include exogenous immune regulatory genes, exogenous screening genes, exogenous reporter genes, and so on. The genomes of said oncolytic viruses may not integrate any exogenous gene.

Vaccinia virus (abbreviated as VV, also known as poxvirus) belongs to the Poxviridae and plays an important role in the history of humanity's fight against infection and disease. Before 1980, vaccinia virus was widely used mainly as a smallpox vaccine and finally eliminated variola virus thoroughly all over the world. With the successful expression of exogenous genes in vaccinia virus, combined with its good safety of vaccination in population, vaccinia virus has gradually been developed into gene expression vectors, preventive and therapeutic vaccine vectors, immunotherapy vectors, etc. According to its different infection phases, there are four different forms of infection in the entire life of vaccinia virus: intracellular mature virus (IMV), intracellular enveloped virus (IEV), cellular enveloped virus (CEV) and extracellular enveloped virus (EEV). In the most of vaccinia virus strains (including WR strain, Copenhagen strain, Ankara strain and Tiantan strain, etc.), IMV accounts for more than 90% of the total progeny viruses. These viruses remain in the cells after being assembled in the virus factory and are not released outside the cells until the cells are lysed.

Oncolytic vaccinia virus includes (but are not limited to): Pexa-vac (available from Jennerex Biotherapeutics Co., Ltd.), JX-963 (available from Jennerex Biotherapeutics Co., Ltd.), JX-929 (available from Jennerex Biotherapeutics Co., Ltd.), VSC20 (the preparation method can be found in scientific literature: "McCart, J A, et al. Systemic cancer therapy with a tumor-selective vaccinia virus mutant lacking thymidine kinase and vaccinia growth factor genes. Cancer Res (2001) 61:8751-8757."), GL-ONC1 (available from Genelux Corporation), TG6002 (available from Transgene Corporation), DDvv-IL21 (see PCT Publication No. WO2019/062234A1), etc.

Varicella-Zoster virus (VZV) belongs to the alpha herpesvirus subfamily and is a double-stranded DNA virus. Its primary infection is varicella. When the latent infection is reactivated, it can cause herpes zoster. Vaccination is the most effective way to prevent varicella and herpes zoster caused by VZV. To date, the live attenuated varicella vaccine (Oka strain) is the only vaccine approved for the prevention of diseases caused by VZV. Vaccination of this vaccine is recognized as the most effective way to prevent varicella caused by VZV.

Herpes simplex virus (HSV) belongs to the alpha virus subfamily of the Herpesviridae. Based on the difference in antigenicity, this virus is currently divided into type 1 and type 2. Herpes simplex virus can use human cells as host cells and has advantages of that it can infect a wide types of cells and human cell, accidental proliferation can be prevented by anti-herpes drugs, does not integrate into the host cell genome during the rise phase and the incubation phase, and the risk of insertional mutation is low. It is widely used in gene therapy of tumors or degenerative diseases of the nervous system. HSV involves lysis pathway and mainly exists in cells.

Oncolytic herpes simplex virus includes (but is not limited to): HSV-1 herpes simplex virus, HSV-2 herpes simplex virus; specifically including (for example): Imlygic® (available from Amgen Co., Ltd.), G207 (available from Medigene Co., Ltd.), HF10 (Available from Takara Bio Co., Ltd.), Seprehvir (available from Virttu Biologics Co., Ltd.), Orien X010 (available from Beijing Oriengene Biologics Co., Ltd.), NV1020 (available from Catherax Co., Ltd.), and so on.

Lentivirus (LV) belongs to the Retroviridae and is an RNA virus. The overall size of lentivirus is about 100 nanometers. It has advantages such as large carrying capacity of gene fragments, high transfection efficiency, wide range of hosts and long-term stable expression. It has now become an ideal vector for the transfer of target genes and is used in clinical treatment, being one of the common viruses used to construct CAR-T cells. Two CAR-T drugs targeting CD19 that have been marketed in the United States, namely Kymriah (available from Novartis) and Yescarta (available from Kate), use lentivirus as vector. Since one time of gene therapy requires a total amount of viruses of 1.0E+12TU, improving the packaging and production level of lentivirus can effectively promote the development of lentivirus-mediated gene therapy. At present, the production of lentivirus is performed by transient transfection of a cell matrix with a plasmid to produce a limited number of packaged viruses. The general construction process includes separately placing 3 proteins Gag/Pol, Rev, VSV-G (instead of Env of HIV-1) necessary for virus packaging on 3 plasmids respectively and constructing the vector of the target gene on the plasmid pLenti-gene, and then co-transfecting the four plasmids into host cells in proportion, collecting the supernatant after the culture, and purifying the viruses.

Retrovirus is single-stranded RNA virus. The retroviral genome is approximately 10 Kb, which comprises three important genes, that is, Gag (encoding the core protein of the virus), Pol (reverse transcriptase), and Env (envelope glycoprotein on the surface of the viral particle) from 5' to 3'. It further comprises long terminal repeats (LTR) and packaging signal w cis-acting elements. The production of retrovirus often includes transfection of cell matrix by using plasmid, construction and screening of stable toxin-producing cell strains. The integration sites of retroviral vectors are usually located in the open region and transcriptionally active region of the chromosome, which greatly increases the probability of obtaining a cell line that efficiently expresses the exogenous target gene. Furthermore, retrovirus is also one of the common viral vectors for constructing CAR-T cells.

Adenovirus (AdV) is a spherical particle without an envelope and its DNA exists in the form of linear double-strand. Adenovirus has no envelope and the nucleocapsid has a diameter of 70-80 nanometers, which is icosahedral three-dimensionally symmetrical. Adenovirus is a relatively safe vector. More than 50% of the population has the antibody to Ad5. Since its advantages such as high transgene efficiency, transduction of wide types of cell, easy preparation and purification, and merely transient expression after entering the host cell without integration into the host cell genome, adenovirus has become more and more important in gene therapy, gene immunization and vaccine preparation and has been widely used in various fields such as vaccine development, immunotherapy, gene therapy, etc.

Oncolytic adenovirus include (but are not limited to): human adenovirus type 5 or human chimeric adenovirus; specifically including (for example): Onyx-015 (available from Onyx Pharmaceuticals Co., Ltd.), H101 (available from Shanghai Sunway Biotech Co., Ltd.), Ad5-yCD/mutTKSR39rep-hIL12 (available from Henry Ford Health System Co., Ltd.), CG0070 (available from Cold Genesys Co., Ltd.), DNX-2401 (available from DNAtrix Co., Ltd.), OBP-301 (available from Oncolys BioPharma Co., Ltd.), ONCOS-102 (available from Targovax Oy Co., Ltd./Oncos Therapeutics Co., Ltd.), ColoAd1 (available from PsiOxus Therapeutics Co., Ltd.), VCN-01 (available from VCN Biosciences Co., Ltd.), ProstAtak™ (available from Advantagene Co., Ltd.) and so on.

Adenovirus-associated virus (AAV) belongs to the Parvoviridae and is a non-enveloped single-stranded linear DNA virus with a genomic DNA less than 5 Kb. AAV has advantages such as high safety, low immunogenicity, wide host range, stable expression and the capacity of infecting cleavage and non-cleavage cells at the same time. It has a very attractive prospect in the biomedical industry, especially in the field of gene therapy. Most of the recombinant AAVs remain in the producer cell.

In one embodiment, the present invention uses 293 cells to produce vaccinia virus (including oncolytic poxvirus). The production method includes:

inoculating working seeds of vaccinia virus to 293 cells and the inoculation amount can be 0.001-0.2 MOI, for example, 0.005, 0.01, 0.02, 0.03, 0.05, 0.08, 0.1, 0.15 MOI;

culturing the inoculated cells to make the cells cytopathic, preferably until the cells are completely cytopathic (usually 48-96 h). For example, cell flasks can be used for the culture, and the culture is, for example, adherent culture; and contacting the cultured cells with the harvesting solution composition of the present invention to harvest the virus in a single step, wherein the harvesting solution composition comprises: a trypsin, a pH buffer and optionally a nuclease, and the pH of the harvesting solution composition is greater than 7.5 and not more than 10.5 and preferably 8.5-9.5; preferably, the harvesting solution composition comprises a Tris buffer, a trypsin and a nuclease, wherein the concentration of the Tris buffer can be 1-50 mM, for example, 1, 3, 5, 8, 10, 20, 30, 40 mM, and preferably 1-10 mM; the concentration of the trypsin can be 0.01-0.12% (w/v), such as 0.03, 0.05, 0.07, 0.09, 0.11% (w/v), and preferably 0.03-0.06% (w/v); the concentration of the nuclease can be 1-100 IU/ml, for example 1, 3, 5, 10, 20, 40, 60, 80 IU/ml, preferably 1-50 IU/ml, and more preferably 1-5 IU/ml; the osmotic pressure of the harvesting solution composition is preferably hypotonic, and the pH is preferably 8.5-9.5;

wherein the amount of the harvesting solution composition can be in the range of greater than or equal to 35 μl of the harvesting solution composition/cm$^2$ cells, preferably in the range of greater than or equal to 70 μl of the harvesting solution composition/cm$^2$ cells, for example, 75, 100, 125, 150, 200 μl of the harvesting solution composition/cm$^2$ cells;

wherein the contact period of the cultured cells with the harvesting solution composition is generally no more than 60 minutes, and the cells can be completely lysed within a contact period of 5-60 minutes (for example, 10, 20, 30, 40, 50 minutes) in general.

The viral production method of the present invention adopts gentle means to obtain the viruses in the cultured cells. The method does not involve cell lysis methods or steps such as freeze-thaw, ultrasound and mechanical disruption, etc. The process is simple, easy to operate and easy to scale up, and very suitable for the production of virus by large-scale cell culture. Moreover, compared to the traditional method commonly used in the prior art (such as the freeze-thaw method), the yield is significantly improved, which is 5-10 times than that of the prior art, and the integrity of the virus particles is ensured at the same time without impairing the biological activity of the virus, thus making large-scale virus production possible.

The following examples further illustrate the content of the present invention, but should not be construed as limiting the present invention. Without departing from the spirit and essence of the present invention, any modifications or replacements made to the methods, steps or conditions of the present invention fall within the scope of the present invention.

All numerical values herein should be understood as modified with the word "about". The numerical range represented by the end value includes all values and subsets within the range (for example, 1 to 100 includes 1, 10, 30, 50, 100, etc.). Although only a few examples can be specifically listed due to space limitations, all possible combinations of values (including the given lowest and highest values) are considered to be explicitly mentioned in this application.

EXAMPLES

Unless specified, the technical means used in the following examples are conventional means well known to those skilled in the art; the reagents used are commercially available products. Unless specified, the percentage concentration (%) of each reagent refers to the volume percentage concentration (% (v/v)) of the reagent. The DMEM, MEM medium, serum, and reagents used are all common-used commercially available products, and the harvesting solution composition (also referred to as the treatment solution or harvesting solution) is prepared according to the instruction of Preparation Example 1.

The materials used in the following examples are explained as follows:

1. Tris Base (Obtained from Biosharp, Catalog Number: 77-86-1)

Preparation of 400 mmol/L of Tris base mother liquor: 1.938 g of Tris base was weighed and dissolved in a small amount of water for injection, and constant volumed to 40 ml using the water for injection. 1 mM Tris was prepared by diluting 400 mmol/L of Tris base mother liquor with water for injection.

2. $NaHCO_3$ (Obtained from Gibco, Catalog Number: 25080-094)

7.5% (w/v) $NaHCO_3$ solution was prepared by using ultrapure water.

3. DMEM (Gibco; Catalog Number: C11965500CP)
Methylcellulose (Sangon Biotech; Product Number: A600615-0250)

4% methylcellulose: 8.0 g of methylcellulose was weighed, 160 ml of ultrapure water was added therein and shaken, then constant volumed to 200 ml with a graduated cylinder, sterilized at 121° C. for 20 min, cooled to room temperature, stored at 4° C., shaken every day until the methylcellulose was completely dissolved.

Semi-solid medium: 360 ml of DMEM medium, 15 ml of FBS and 125 ml of 4% methylcellulose were taken, shaken to be mixed uniformly, and stored at 4° C.

4. Trypsin (Obtained from Gibco, Catalog Number A12177-01)

The trypsin was diluted with the treatment solution to a final concentration of 0.01-0.12% (w/v) when used.

5. Nuclease (Obtained from Merck, Catalog Number 70746-10KUN)

The nuclease was diluted with the treatment solution to a final concentration of 1-100 IU/ml when used. 1 mM of $MgCl_2$ (for example) can be added to make the nuclease work.

6. The composition of the PBS buffer: 137 mM of NaCl, 2.7 mM of KCl, 10 mM of $Na_2HPO_4$, 2 mM of $KH_2PO_4$, PH 7.2.

The composition of the buffer "potassium dihydrogen phosphate and disodium hydrogen phosphate" is 0.29% (g/ml) of potassium dihydrogen phosphate and 0.026% (g/ml) of disodium hydrogen phosphate, pH 7.2-7.4.

The potassium dihydrogen phosphate was obtained from Shanghai Sinopharm Co., Ltd., catalog number: 7778-77-0; the disodium hydrogen phosphate was obtained from Hushi Co., Ltd., catalog number: 10020318; all of them are analytically pure.

7. Working seeds of vaccinia virus: the vaccinia virus is the recombinant oncolytic poxvirus DDvv-hIL21 disclosed in PCT Publication No. WO2019/062234 A1, the preparation method of which was described in preparation examples 1 and 2 of this PCT application.

9. 293 [HEK-293] cells were derived from ATCC, catalog number ATCC® CRL-1573. Vero cells were derived from ATCC, catalog number ATCC® CCL-81. Hela cells were derived from ATCC, catalog number ATCC® CCL-2). The SLF-1 cell strain was derived from the China General Microbiological Culture Collection Center (CGMCC), deposit number CGMCCNo.4875.

The test methods used in the following examples are described as follows:

1. Counting by Trypan Blue Staining Method

The cells were washed with PBS, digested with trypsin and suspended in PBS, and trypan blue staining solution with a final concentration of 0.04% (w/v) was added. Then, the cells were counted under the microscope, wherein dead cells were stained blue, live cells were transparent and colorless. The number of live cells was taken as the final data.

2. Determination of Virus Titer (1) Determination of Virus Titer by Plaque Forming Unit (Pfu) Method Vero cells were inoculated in a 6-well plate. The cell culture medium was gently aspirated when the cells were spread more than 80% of the 6-well plate. 500 μl of the virus sample to be tested, which has been diluted with a cell maintenance solution, was added. 5 parallel wells were set for each dilution, and one well with the cell maintenance solution was used as a negative control. The plate was shaken gently, placed at 37° C. for 2 h, shaken gently once every 30-60 min; the liquid in the well was aspirated, added with 2 ml of DMEM medium to rinse once in order to remove unadsorbed free viruses, added with 3-4 ml of semi-solid medium and incubated statically in a 5% $CO_2$ incubator at 37° C. for 2-3 days. During the incubation period, the formation of virus plaque was observed. (Sterility is not required for the following steps). The 6-well plate was taken out and the semi-solid medium was discard, added with 1 ml of 1% crystal violet staining solution and placed statically at room temperature for 30 min-3 h; the staining solution was gently washed away with running water and the number of plaques per well was counted (or counted after drying). The virus titer was calculated according to the following formula.

Virus titer (pfu/ml)=average number of virus plaque×dilution multiple/added virus volume (ml)

(2) Determination of the Titer by Tissue Culture Half-Infectious Dose (TCID50) Method 293 cells were prepared into a suspension with a concentration of about $1\times10^5$/ml with DMEM culture solution, and inoculated in a 96-well plate at 100 μl/well (at the same time, a viral diluent was prepared by 10-fold dilution to infect the above-mentioned cells respectively). 100 μl of virus diluent of the same concentration was added to the first 10 wells of each row, and an equal volume of 2% BCS DMEM was added to the 11th and 12th wells, as negative control. The plate was placed in a $CO_2$ incubator at 37° C. for 10 days, then observed under a fluorescent inverted microscope to judge and record the cytopathic effect (CPE) of each row. The criterion is that it is deemed as positive as long as a small number of cells show CPE. If it is difficult to determine the CPE or cell death, compare the well with the negative control.

The titer was calculated according to the following formula: $T=10^{1+d(S-0.5)}$ IU/ml wherein, d=Log10 dilution multiple, S=the sum of positive ratios from the first dilution, the difference between the titer obtained from 2 parallel experiments should $\leq 10^{0.7}$.

3. Determination of the Number of Viral Particles

Virus was fully lysed with the virus lysis solution, and the virus preservation solution was used as a blank to determine the OD260 of the sample.

After the virus sample was treated with SDS (sodium dodecyl sulfate), the number of viral particles was determined by measuring the A260 nm value (UV-SDS method): 250 μl of the virus was taken, added with an equal volume of 0.2% SDS solution, shaken to be mixed uniformly, and placed in water bath at 56° C. for 10 minutes. When the temperature was cooled to room temperature, transient centrifugation was carried out. The virus stabilizing solution and 0.2% SDS solution were mixed in equal volume and the obtained solution was used as a blank control. The absorbance at 260 nm and 280 nm was measured. Two parallel experiments were carried out.

Calculation formula:

$$\text{Number of viral particles} = A260\,nm \times \text{dilution multiple} \times 1.1 \times 10^{12}$$

Preparation Example 1

1. Preparation of Treatment Solution (Also Referred as to Harvesting Solution) for Harvesting The harvesting solution was prepared in a sterile environment, the steps are as follows:
(1) The corresponding amount of reagents were added to the water for injection according to Table 1 to be dissolved sufficiently;
(2) The sufficiently dissolved solution in step (1) was constant volumed to the target volume with water for injection;
(3) The pH was adjusted to the corresponding value;
(4) Sterilized by filtration, stored at room temperature for later use;
(5) The osmotic pressure of each solution was measured by the automatic freezing point osmometer method, and the results are as follows:
osmotic pressure of 1 mM Tris: 1 mOsmol/kg
osmotic pressure of 7.5% NaHCO$_3$: 1785 mOsmol/kg

TABLE 1

The main components of the treatment solution

| Group | Buffer composition | pH | Final concentration of recombinant trypsin (%(w/v)) | Final concentration of nuclease (IU/ml) |
|---|---|---|---|---|
| A | 1 mM Tris | 9.3 | 0.03 | 5 |
| B | 1 mM Tris | 9.3 | 0.06 | 50 |
| C(control group) | Potassium dihydrogen phosphate and disodium hydrogen phosphate | 7.2 | 0 | 0 |
| D(control group) | PBS | 7.2 | 0.12 | 100 |
| E(control group) | 1 mM Tris | 7.2 | 0.12 | 100 |
| G | 1 mM Tris | 9.3 | 0.06 | 5 |
| H | 7.5%(w/v) NaHCO$_3$ | 8.5 | 0.06 | 5 |

2. Cell Culture

Preparation of Chicken Embryo Fibroblasts (CEF):

7-9 days old SPF chicken embryos were taken. The surface of the eggs were wiped by iodine and 75% alcohol cotton balls. After the chicken embryos were taken, the head, limbs and internal organs thereof were removed. The remaining tissue pieces were cut and digested statically by trypsin for 15-20 minutes at room temperature. Added with DMEM complete medium and repeated purged by an automatic pipette, placed for 5 minutes to settle. The tissue was diluted with DMEM and the treated tissue was filtered 3 times with four layers of sterile gauze. Finally, the count for single cell was performed. The treated CEF cells were cultured overnight at 37° C. The morphology and quality of cells were observed under the microscope. The cells were counted by trypan blue staining and confirmed with a live cell counter. The viability of the prepared CEF cells was calculated. The microscopic observation showed that they were intact in morphology and in good condition.

293, Vero, Hela cells were cultured by conventional techniques. The processes are as follows: adherent cells with a confluence rate of 80%-90% were taken out of the 37° C., 5% CO$_2$ incubator. The surface of the cell culture flask was sprayed with 75% alcohol. Then the cell culture flask was rotated and placed in a biological safety cabinet and the medium was sucked up with a sterile pipette. A certain amount of pre-heated PBS was added to wash it once, and then the PBS was sucked up. 0.25% (w/v) of trypsin was added to the cell culture flask which was shaken to fully spread the trypsin on the cell surface. The bottle cap was closed and the cell culture flask was placed in a 37° C., 5% CO$_2$ incubator for digestion. The cells were observed under the microscope to see if they are turned round. If they are not completely rounded, continue to digest until the cells are completely round; a certain volume of medium comprising 10% FBS was added to stop the reaction. The cells on the flask were gently blown down with a pipette, and were resuspended by repeated pipetting. After resuspension, the cells were taken into a new cell culture flask, added with 10% FBS medium, cultured in a 37° C., 5% CO$_2$ incubator, and observed every day until the confluence rate reached 80%-90%. Then the cells were passaged again.

Example 2: Test of the Cell Lysis Efficacy of the Treatment Solution

T75 cell culture flasks (the cell culture area in each flask is 75 cm$^2$) were used to culture 293, Vero, Hela cells. After the cells grew to a monolayer, they were used for the test of the cell lysis efficiency of the harvesting solution.

(1) Preparation of the Treatment Solution: The Preparation was Carried Out in Accordance with the Treatment Solution Formulation Described in Preparation Example 1.

(2) Test of the Cell Disruption Efficacy (Cell Lysis State after Trypsin Digestion)

When the 293, Vero, and Hela cells grew to a monolayer, the initial growth medium was discarded. The cells were completely digested by 1 ml of 0.25% (w/v) trypsin at 37° C. for 2 minutes. 5-10 ml of 10% FBS+DMEM medium was added to stop the digestion. After mixing uniformly, centrifugation was performed at 300 g for 10 min. The supernatant was discarded. The cell pellets were mixed uniformly with 8 ml of the treatment solution of groups A-E in Preparation Example 1 and were placed statically at room temperature (up to 120 min). Time was record and the changes in cell morphology were observed under a microscope. A small amount of cell suspension was taken to observe the cell disruption under the microscope. When no intact cell can be observed under the microscope (considered as completely lysed), the suspension was centrifuged at 300 g for 10 minutes to see if there is any precipitate after the centrifugation. The experiment for each group was repeated more than three times.

(3) Test of the Cell Disruption Efficacy (Cell Lysis In Situ)

When the 293, Vero, and Hela cells grew to a monolayer, the initial growth medium was discarded. The cell surface of the adherent cells was washed with 2-5 ml of the treatment solution of groups A-E in Preparation Example 1 for 1-2 times, and then 8 ml of the same fresh treatment solution was added. The cells were placed statically at room temperature. Time was record and the changes in cell morphology were observed under a microscope. When no intact cell can be observed under the microscope (considered as completely lysed), the suspension was centrifuged at 300 g for 10 minutes to see if there is any precipitate after the centrifugation. The experiment for each group was repeated more than three times.

The test results are shown in Table 2 and Table 3 respectively.

TABLE 2

Cell lysis after trypsin digestion

| Treatment solution | Types of cells | Lysis time (min) | Disruption state under microscopy | State upon the suspension being centrifuged after lysis |
|---|---|---|---|---|
| A | 293 | 10 | no intact cells, cell debris with a small particle size | no precipitate, supernatant was not viscous |
|   | Vera | 15 | no intact cells, cell debris with a small particle size | almost no precipitate, supernatant was not viscous |
|   | HeLa | 10 | no intact cells, cell debris with a small particle size | no precipitate, supernatant was not viscous |
| B | 293 | 5 | no intact cells, cell debris with a small particle size | no precipitate, supernatant was not viscous |
|   | Vero | 10 | no intact cells, cell debris with a small particle size | almost no precipitate, supernatant was not viscous |
|   | HeLa | 5 | no intact cells, cell debris with a small particle size | no precipitate, supernatant was not viscous |
| C | 293 | >120 | many intact cells, cell debris with a large particle size | a lot of precipitates, supernatant was viscous |
|   | Vero | >120 | many intact cells, cell debris with a large particle size | a lot of precipitates, supernatant was viscous |
|   | HeLa | >120 | many intact cells, cell debris with a large particle size | a lot of precipitates, supernatant was viscous |
| D | 293 | 60 | a small amount of intact cells, cell debris with a large particle size | existed precipitate, supernatant was not viscous |
|   | Vera | 80 | small amount of intact cells, cell debris with a large particle size | existed precipitate, supernatant was not viscous |
|   | HeLa | 60 | small amount of intact cells, cell debris with a large particle size | existed precipitate, supernatant was not viscous |
| E | 293 | 60 | small amount of intact cells, cell debris with a large particle size | existed precipitate, supernatant was not viscous |
|   | Vero | 80 | small amount of intact cells, cell debris with a large particle size | existed precipitate, supernatant was not viscous |
|   | HeLa | 60 | small amount of intact cells, cell debris with a large particle size | existed precipitate, supernatant was not viscous |

TABLE 3

Cell lysis In situ

| Treatment solution | Types of cells | Lysis time (min) | Disruption state under microscopy | State upon the suspension being centrifuged after lysis |
|---|---|---|---|---|
| A | 293 | 15 | no intact cells, cell debris with a small particle size | no precipitate, supernatant was not viscous |
|   | Vero | 15 | no intact cells, cell debris with a small particle size | almost no precipitate, supernatant was not viscous |
|   | HeLa | 10 | no intact cells, cell debris with a small particle size | no precipitate, supernatant was not viscous |
| B | 293 | 10 | no intact cells, cell debris with a small particle size | no precipitate, supernatant was not viscous |
|   | Vero | 15 | no intact cells, cell debris with a small particle size | almost no precipitate, supernatant was not viscous |

TABLE 3-continued

Cell lysis In situ

| Treatment solution | Types of cells | Lysis time (min) | Disruption state under microscopy | State upon the suspension being centrifuged after lysis |
|---|---|---|---|---|
|  | HeLa | 10 | no intact cells, cell debris with a small particle size | no precipitate, supernatant was not viscous |
| C | 293 | >120 | many intact cells, cell debris with a large particle size | a lot of precipitates, supernatant was viscous |
|  | Vero | >120 | many intact cells, cell debris with a large particle size | a lot of precipitates, supernatant was viscous |
|  | HeLa | >120 | many intact cells, cell debris with a large particle size | a lot of precipitates, supernatant was viscous |
| D | 293 | 80 | a small amount of intact cells, cell debris with a large particle size | existed precipitate, supernatant was not viscous |
|  | Vero | 120 | a small amount of intact cells, cell debris with a large particle size | existed precipitate, supernatant was not viscous |
|  | HeLa | 80 | a small amount of intact cells, cell debris with a large particle size | existed precipitate, supernatant was not viscous |
| E | 293 | 80 | a small amount of intact cells, cell debris with a large particle size | existed precipitate, supernatant was not viscous |
|  | Vero | 120 | a small amount of intact cells, cell debris with a large particle size | existed precipitate, supernatant was not viscous |
|  | HeLa | 80 | a small amount of intact cells, cell debris with a large particle size | existed precipitate, supernatant was not viscous |

In this example, both of the test of cell lysis after digested by the trypsin and the test of cell lysis in situ showed the results below:

Treatment solution of groups A and B can completely lyse the cells within 15 minutes, and the time of complete lysis of cells in group B was shorter than that of the cells in group A. Cell debris were small and there was no obvious precipitate and the supernatant was not viscous after the cell suspension was centrifuged. The effect for removing nucleic acid was obvious. The ratio of lysed cell was 100%. There was no significant difference between 293, Vero and HeLa cells;

Treatment solution of group C (control group) had a poor cell lysis effect. After 120 minutes of lysis, many cell morphologies were still visible under the microscope. Obvious precipitates were visible after the cell suspension was centrifuged; the supernatant was viscous, indicating that some cells had been lysed and intracellular substances such as nucleic acids were released;

Treatment solution of groups D and E (control group) can basically lyse cells with the extension of lysis time. Observation under the microscope showed that the cell debris were large. After the cell suspension was centrifuged, there was no obvious precipitate and the supernatant was not viscous. The effect for removing nucleic acid was obvious. The ratio of lysed cell was less than 100%. There was no significant difference between 293, Vero and Hela cells;

It can be found by comparing the cell lysis after trypsin digestion with the cell lysis in situ as shown in Table 2 and Table 3 that the lysis effect of the harvesting solution of each group is basically the same. It took less time when cells were digested with trypsin first than the lysis in situ. Therefore, the effect of treatment with harvesting solution after digesting with trypsin is slightly better than the effect of the lysis in situ. The treatment solution of groups A and B can effectively lyse the 293, Vero, Hela cells within 30 minutes whether the cells were digested with trypsin or lysed in situ, indicating that the harvesting solution of the present invention is applicable to 293, Vero, and HeLa cells.

Example 3: The Influence of the Virus Culture and the Treatment Solution on Viral Titer Culture and harvest of vaccinia virus: 293, HeLa, and CEF cells were inoculated into T75 cell culture flasks, respectively. When the cells grew adherently to the confluence of more than 80%, vaccinia virus working seeds were inoculated to each cell at a MOI of 0.02. The cells in cell culture flask inoculated with viruses were placed at $37.0\pm1.0°$ C. for the adsorption for 2h; after the adsorption was completed, a virus maintenance solution containing 2% FBS was supplemented, and the cells were placed in a $37.0\pm1.0°$ C. incubator to continue culturing until the cells were completely cytopathic (usually 48-9 6h); then the culture solution was discarded, the treatment solution of groups A-E described in Preparation Example 1 was added for the treatment of 10-60 minutes, respectively. The cell status was observed under the microscope. After the cells were completely lysed (maximum lysis time is 60 min), the virus solution was collected and the time of the cell to be lysed and cell disruption state were recorded. The virus solution was centrifuged at 300 g for 10 minutes and then the supernatant was taken to test the virus titer. The existence of precipitate after the centrifugation and the viscosity of the supernatant were recorded. At the same time, a freeze-thaw control group (freeze-thaw group for short) was set as follows: the completely cytopathic cells were pipetted down, and the cells and the infection medium were transferred to a 15 ml of sterile centrifuge tube, placed in a refrigerator at −80° C. to quickly freeze for 120 minutes, then quickly put in a 37° C. water bath to thaw for 10 minutes, repeated 3 times. The virus solution was centrifuged at 750 g for 10 minutes and then the supernatant was taken to detect the virus titer. The experiment for each group was repeated more than three times and the average value was taken for statistical analysis.

The virus titer was determined by the plaque assay (that is, the plaque forming unit method). The harvesting effect and the influence on the virus titer of the treatment solution of each group was evaluated according to the test results. The results are shown in Table 4 below.

centrifuged which indicates that cells had been lysed and intracellular substances such as nucleic acids were released after three freeze-thaw cycles. The ratio of lysed cell was less than 100%. There was no significant difference between 293 and HeLa cells.

TABLE 4

Test results of the harvest of vaccinia viruses by treatment solutions

| Treatment solution | Types of cells | Treatment time (min) | Disruption state by microscopy | After centrifugation | Titer per unit area (pfu/cm$^2$) |
|---|---|---|---|---|---|
| A | 293 | 10 | no intact cells, cell debris with a small particle size | no precipitate, supernatant was not viscous | 5.5E+06 |
|   | HeLa | 10 | no intact cells, cell debris with a small particle size | no precipitate, supernatant was not viscous | 1.3E+07 |
| B | 293 | 10 | no intact cells, cell debris with a small particle size | no precipitate, supernatant was not viscous | 4.4E+06 |
|   | HeLa | 10 | no intact cells, cell debris with a small particle size | no precipitate, supernatant was not viscous | 1.0E+07 |
| C | 293 | 60 | many intact cells, cell debris with a large particle size | a lot of precipitates, supernatant was viscous | 8.0E+05 |
|   | HeLa | 60 | many intact cells, cell debris with a large particle size | a lot of precipitates, supernatant was viscous | 2.1E+06 |
| D | 293 | 60 | a small amount of intact cells, cell debris with a large particle size | existed precipitate, supernatant was not viscous |  |
|   | HeLa | 60 | a small amount of intact cells, cell debris with a large particle size | existed precipitate, supernatant was not viscous |  |
| E | 293 | 60 | a small amount of intact cells, cell debris with a large particle size | existed precipitate, supernatant was not viscous |  |
|   | HeLa | 60 | a small amount of intact cells, cell debris with a large particle size | existed precipitate, supernatant was not viscous |  |
| F (Freeze-thaw control group) | 293 |  | many intact cells, cell debris with a large particle size | no precipitate, flocculent supernatant | 8.3E+05 |
|   | HeLa |  | many intact cells, cell debris with a large particle size | no precipitate, flocculent supernatant | 2.2E+06 |
|   | CEF |  | many intact cells, cell debris with a large particle size | no precipitate, flocculent supernatant | 1.0E+06 |

The results of this experiment show that:

Both of the treatment solution of groups A and B can completely lyse the cells within 10 minutes; the cell debris were small and there was no obvious precipitate and the supernatant was not viscous after the cell suspension was centrifuged. The effect for removing nucleic acid was obvious. The ratio of lysed cell was 100%. There was no significant difference between 293 and Hela cells;

Treatment solution of group C (control group) has a poor cell lysis effect. After 60 minutes of lysis, many cell morphologies can still be seen under the microscope and obvious precipitate can be seen after the cell suspension was centrifuged. The supernatant is relatively viscous, indicating that some cells had been lysed and intracellular substances such as nucleic acids were released;

Treatment solution of groups D and E (control group) can basically lyse cells with the extension of lysis time. Observation under the microscope showed that the cell debris were large. After the cell suspension was centrifuged, there was no obvious precipitate and the supernatant was not viscous. The effect for removing nucleic acid was obvious. The ratio of lysed cell was less than 100%. There was no significant difference between 293 and Hela cells;

In group F (freeze-thaw control group), after three freeze-thaw cycles, the cell morphology was still visible and cell debris were large under the microscope. There was no obvious precipitate and the supernatant was viscous with flocculent floats after the cell suspension was Treatment solution of groups A and B can effectively lyse 293 and Hela cells in situ within 10 minutes, indicating that the harvesting solution of the present invention is applicable to both 293 and Hela cells. (Virus titer deviation≤30% pfu/ml is regarded as an acceptable detection error range, similarly hereinafter). By testing the anti-tumor activity in vitro and in vivo, it is believed the biological activity of the prepared oncolytic virus was not impaired.

Example 4: The Influence of Different Treatment Methods on the Harvest of Viruses 293 cells were cultivated. When the cells grew adherently to a confluence more than 80%, vaccinia virus working seeds were inoculated to the cells at a MOI of 0.02. The virus-inoculated cells in T75 cell flask were placed at 37.0±1.0° C. for the adsorption for 2 hours. After the adsorption was completed, the virus maintenance solution containing 2% FBS was supplemented and the cells were placed in a 37.0±1.0° C. incubator to continue culturing for 48 h. After the cells were completely cytopathic, the intracellular viruses and supernatant (extracellular virus) were harvested. 8 ml of treatment solution G for harvesting and treatment solution H for harvesting were added respectively to the intracellular viruses for the treatment of 10 min. The cell status was observed under the microscope. After the cells were completely lysed, the virus solution was collected. The virus solution was centrifuged at 300 g for 10 minutes and the supernatant was taken to detect the virus titer. At the same time, a freeze-thaw control group was set as follows: the completely cytopathic cells were pipetted down, and the cells and the infection medium were transferred to a 15 ml of sterile centrifuge tube, placed in a refrigerator at −80° C. to quickly freeze for 120 minutes, then quickly put in a 37° C. water bath to thaw for 10 minutes, repeated 3 times. The virus solution was centrifuged at 750 g for 10 minutes and then the supernatant was taken to detect the virus titer. The titer of the viruses harvested after treated with the treatment solution was evaluated. The experiment for each group was repeated more than three times and the average value was taken for statistical analysis.

Figure 1:
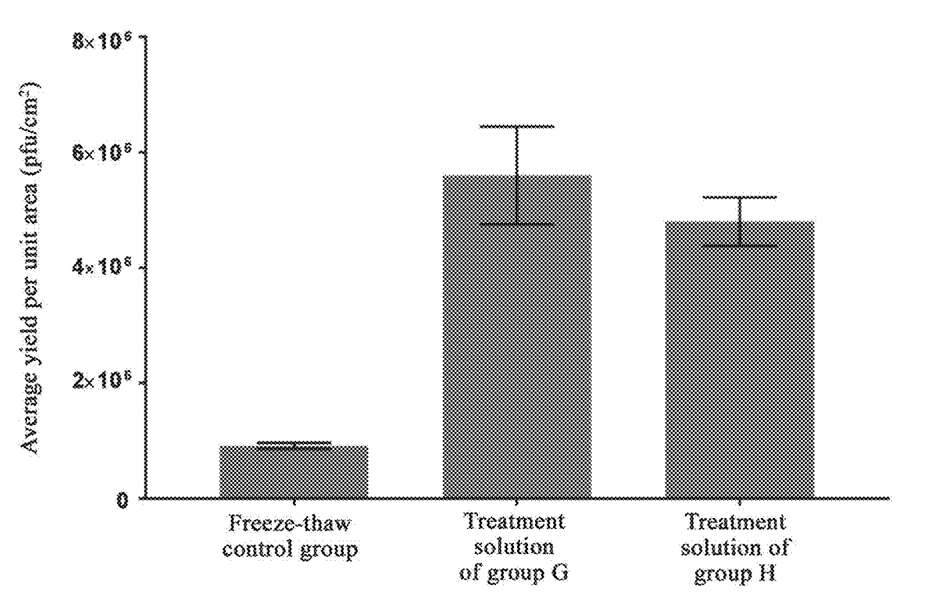
FIG. 1 shows the results of the harvest of viruses with different treatment solutions in one embodiment of the present application. The abscissa represents different groups and the ordinate represents the average yield per unit area (pfu/cm$^2$).

The results of this experiment are shown in FIG. 1. The figure shows that for the harvest when the cells were completely lysed to release the viruses, the results obtained varied greatly due to the different treatment for the intracellular virus, wherein: the yield of the freeze-thaw group is low; the yield of the treatment solution group G (1 mM Tris+0.06% (w/v) trypsin+5IU/ml nuclease) was about 6 times than that of the freeze-thaw group; the yield of the treatment solution group H (7.5% $NaHCO_3$+0.06% (w/v) trypsin+5IU/ml Nuclease) was about 5 times than that of the freeze-thaw group.

Example 5: The Influence of the Treatment with Different Dosages of Treatment Solution on the Harvest of Viruses 293 cells were Inoculated into a T75 cell culture flask. When the cells grew adherently to a confluence more than 80%, vaccinia virus working seeds were inoculated to the cells at a MOI of 0.02. The virus-inoculated cells in cell culture flask were placed at 37.0±1.0° C. for the adsorption for 0-2 hours. After the adsorption was complete, the virus maintenance solution containing 2% FBS was supplemented and the cells were placed in a 37.0±1.0° C. incubator to continue the culture. The viruses were harvested after the cells were completely cytopathic. The culture solution was discarded and the treatment solution group A as described in Preparation Example 1 was added according to the area of the cultured cells, i.e., 35 μl/cm², 70 μl/cm², 150 μl/cm², respectively. The treatment was performed for 10 and 30 min, respectively. The cell status was observed under the microscope. The virus solution was collected and the cell disruption state was recorded. The virus solution was centrifuged at 750 g for 10 minutes, and then the supernatant was taken to test the virus titer. The existence of precipitate after the centrifugation and the viscosity of the supernatant were recorded. At the same time, a freeze-thaw control group was set as follows: the completely cytopathic cells were pipetted down, and the cells and the infection medium were transferred to a 15 ml of sterile centrifuge tube, placed in a refrigerator at −80° C. to quickly freeze for 120 minutes, then quickly put in a 37° C. water bath to thaw for 10 minutes, repeated 3 times. The virus solution was centrifuged at 750 g for 10 minutes and then the supernatant was taken to detect the virus titer by the plaque assay. The influence of the treatment solution with different dosages and for different treatment time on the harvest effect and titer were evaluated according to the result of each test. The results are shown in Table 5 below.

TABLE 5

Test results of treatment solution with different dosages and for different treatment time compared with the freeze-thaw group

| Dosage (μl/cm²) | Time (min) | Disruption state under microscopy | After centrifugation | Titer per unit area(pfu/cm²) |
|---|---|---|---|---|
| 35 | 10 | Intact cells, cell debris with a large particle size | existed precipitate, supernatant was not viscous | 5.9E+05 |
|  | 30 | no intact cells, cell debris with a large particle size | existed precipitate, supernatant was not viscous | 8.0E+05 |
| 70 | 10 | intact cells, cell debris with a large particle size | existed precipitate, supernatant was not viscous | 7.7E+05 |
|  | 30 | no intact cells, cell debris with a large particle size | existed precipitate, supernatant was not viscous | 1.7E+06 |
| 150 | 10 | no intact cells, cell debris with a large particle size | no precipitate, supernatant was not viscous | 4.5E+06 |
|  | 30 | no intact cells, cell debris with a large particle size | no precipitate, supernatant was not viscous | 3.5E+06 |
| Freeze-thaw control group |  | no intact cells, cell debris with a large particle size | no precipitate, with flocculent supernatant | 5.2E+05 |

The results of this experiment show that:

The treatment dosage and the treatment time have a significant effect on the cell lysis and virus yield. When the treatment solution group A in the amount of 35, 70, 150 μl/cm² were used to treat the harvested intracellular virus, the cells can be effectively lysed within 30 minutes and the cell lysis ratio was 100% and the supernatant was not viscous. The cell lysis efficiency was positively correlated with the dosage of the treatment solution and the treatment time. When the dosage of the treatment solution was 150 μl/cm² and the treatment time was 10 min, the virus titer was the highest which was more than 6 times than that of the freeze-thaw group.

Example 6: Culture and Harvest of Various Exemplary Viruses

Culture and harvest of the varicella virus: SLF-1 cells were inoculated into a T25 cell culture flask and when the cells grew to a monolayer, Oka strain of varicella-zoster virus (from ATCC, numbered as VR-795) working seeds were inoculated to the SLF-1 cells at a MOI of 0.001-0.1. The virus-inoculated cells in the cell flask were placed at 35.0±1.0° C. for the adsorption for 2 hours. After the adsorption was complete, the virus MEM maintenance solution was supplemented, and the cells were then placed in a 35.0±1.0° C. incubator to continue culturing for 48-9 6h. The culture solution was discarded and the harvesting solution groups of A-E described in Preparation Example 1 were added. The cells were placed statically at room temperature for 10 minutes and the cell status was observed under the microscope. The cells were shaken to fall off when the cells were significantly swelled and then the virus solution was collected. the cell swelling time, the cell detachment ratio, the cell disruption and the virus titer were detected. At the same time, a freeze-thaw harvesting control group was set. The harvesting effect of the harvesting solution of each group and their effect on the virus titer were evaluated according to the results.

Culture and harvest of HSV: Vero cells were placed in a 37° C., 5% $CO_2$ incubator for expansion and culture. After the cells grew to a monolayer, they were infected with viruses at a MOI=0.001-0.1, respectively. The infected cells and the supernatant were harvested when the cells became rounded and did not yet fall off. The treatment solution of groups A-E described in Preparation Example 1 were added for the treatment of 10-60 min, respectively. The cell status was observed under the microscope. After the cells were completely lysed (maximum lysis time was 60 min), the virus solution was collected and the time of the cell to be lysed and the cell disruption were recorded. The virus solution was centrifuged at 300 g for 10 minutes and then the supernatant was taken to test the virus titer. The existence of precipitate after the centrifugation and the viscosity of the supernatant were recorded. At the same time, a freeze-thaw control group and a supernatant control group were set. The virus titer was measured by plaque assay. The harvesting effect of the treatment solution of each group at different time points and their effect on the virus titer were evaluated according to the results.

Culture and harvest of adenovirus: 293 cells were placed in a 37° C., 5% $CO_2$ incubator for expansion and culture. When the cells grew to a monolayer, they were infected with viruses at a MOI=1-100, respectively. The infected cells and the supernatant were harvested when the cells became rounded and did not yet fall off. The treatment solution of groups A-E described in Preparation Example 1 were added for the treatment of 10-60 min, respectively. The cell status was observed under the microscope. After the cells were completely lysed (maximum lysis time was 60 min), the virus solution was collected and the time of the cell to be lysed and the cell disruption were recorded. The virus solution was centrifuged at 300 g for 10 minutes and then the supernatant was taken to test the virus titer. The existence of precipitate after the centrifugation and the viscosity of the supernatant were recorded. At the same time, a freeze-thaw control group and a supernatant control group were set. The virus titer was measured according to TCID50 method. The harvesting effect of the treatment solution of each group at different time points and their effect on the virus titer were evaluated according to the results.

Culture and harvest of lentivirus: 293 cells were placed in a 37° C., 5% $CO_2$ incubator for expansion and culture. 4 kinds of plasmids (that is, 3 kinds of protein Gag/Pol, Rev, VSV-G (instead of Env of HIV-1) necessary for virus packaging were placed on 3 plasmids independently and respectively; the vector of the target gene was constructed on the plasmid pLenti-Gene, so as to obtain 4 kinds of plasmids) were added to infect cells. The infected cells and the supernatant were harvested when the cells became rounded and did not yet fall off. The treatment solution of groups A-E described in Preparation Example 1 were added for the treatment of 10-60 min. The cell status was observed under the microscope. After the cells were completely lysed (maximum lysis time was 60 min), the virus solution was collected and the time of the cell to be lysed and the cell disruption were recorded. The virus solution was centrifuged at 300 g for 10 minutes and then the supernatant was taken to test the virus titer. The existence of precipitate after the centrifugation and the viscosity of the supernatant were recorded. At the same time, a freeze-thaw control group and a supernatant control group were set. The harvesting effect of the treatment solution of each group at different time points and their effect on the virus titer were evaluated according to the results.

Example 7: Scale-Up Experiment of Virus Producing Process

After resuscitated, 293 cells were expanded and cultured with DMEM medium containing 10% calf serum. When the cell confluence was 80%-90%, the cells were inoculated into a cell factory and were digested to prepare a cell suspension after being cultured in a $CO_2$ incubator for about 48 hours. The cell suspension was used to inoculate into a cell fermentor (obtained from NBS company, CelliGen Plus/310, surface area was about 22 square meters); the cells were cultured by perfusion and were infected with vaccinia viruses at a MOI=0.02 after 6-8 days. The viruses were harvested after the cells were infected with the viruses for about 48-7 2h, wherein $1.3 \times 10^{13}$ PFU/fermentor of viruses can be harvested by using the treatment solution of group G described in Preparation Example 1.

Example 8: Scale-Up Experiment of the Process Using Cell Factory

After resuscitated, 293 cells were expanded with DMEM medium containing 10% calf serum to three 10-layer cell factories (Corning, "CellSTACK Chamber, 10 STACK, POLYSTYRENE, STERILE, 1/6", the total area of the three 10-layer cell factories: 6360*3=19080 $cm^2$). When the cell confluence was 80%-90%, the cells were infected with vaccinia viruses at a MOI=0.02 with the infection medium of DMEM medium containing 2% serum. About 72 hours after the infection with the viruses, the cells were clapped down and transferred to a sterile centrifuge bottle together with the culture medium, centrifuged at 4° C., 2000 rpm for 30 minutes upon being balanced. The supernatant was discarded and the cell pellet was treated with 3 L of treatment solution that had been equilibrated to room temperature (about 157 µl/$cm^2$ cells) for the lysis and harvest. The composition of the treatment solution was 1 mM Tris, 0.03% recombinant trypsin, 5U/ml nuclease, pH9.0, added with 1 mM $MgCl_2$. $7.80 \times 10^{10}$ PFU of viruses (the yield per unit area: $4.09 \times 10^6$ PFU/$cm^2$) can be harvested.

Example 9: Scale-Up Experiment of the Process Using Fermentor (5 L)

293 cells were resuscitated in three T225 cell culture flasks (Corning, catalog number: 431082), expanded and cultured with DMEM medium containing 10% calf serum. The cells were inoculated into one 10-layer cell factory (Corning, "CellSTACK Chamber, 10 STACK, POLYSTYRENE, STERILE, 1/6", total area: 6360 $cm^2$) when the cell confluence was 80%-90%. The cells were digested to prepare a cell suspension after being cultured in a $CO_2$ incubator for about 72 hours. The cell suspension was used to inoculate into a cell fermentor (purchased from Eppendorf, BioFlo 320, the surface area of the 5 L cell fermentor was about 150,000 $cm^2$) with an inoculation volume of 470 ml and a total number of cells of $1.78 \times 10^9$. The cells were cultured by perfusion and were infected with vaccinia viruses at a MOI=0.025 after 6-8 days. About 72 hours after the infection with the viruses, the cells were lysed and the viruses were harvested in situ with the treatment solution. The composition of the treatment solution was 1 mM Tris, 0.03% recombinant trypsin, 5U/ml nuclease, pH 9.3, added with 1 mM $MgCl_2$. The total amount of the treatment solution was about 13.5 L (about 90 μl/cm² cells). $4.41 \times 10^{11}$ PFU/fermentor of viruses (the yield per unit area was: $2.94 \times 10^6$ PFU/cm²) can be harvested.

Example 10: Scale-Up Experiment of the Process Using Fermentor (5 L)

293 cells were resuscitated in three T225 cell culture flasks (Corning, catalog number: 431082), expanded and cultured with DMEM medium containing 10% calf serum. When the cell confluence was 80%-90%, the cells were inoculated into one cell factory (Corning, "CellSTACK Chamber, 10 STACK, POLYSTYRENE, STERILE, 1/6", total area: 6360 cm²). The cells were digested to prepare a cell suspension after being cultured in a $CO_2$ incubator for about 72 hours. The cell suspension was used to inoculate into a cell fermentor (purchased from Eppendorf, BioFlo 320, the surface area of the 5 L cell fermentor was about 150,000 cm²) with an inoculation volume of 430 ml and a total number of cells of $1.97 \times 10^9$. The cells were cultured by perfusion and were infected with vaccinia viruses at a MOI=0.06 after 6-8 days. About 5 days after the infection with the viruses, the cells were lysed and the viruses were harvested in situ with the treatment solution. The composition of the treatment solution was 1 mM Tris, 0.03% recombinant trypsin, 5U/ml nuclease, pH 9.3, and added with 1 mM $MgCl_2$. The total amount of the treatment solution was about 15 L (about 100 μl/cm² cells). $2.41 \times 10^{11}$ PFU/fermentor of viruses (the yield per unit area was: $1.61 \times 10^6$ PFU/cm²) can be harvested.

Example 11: Scale-Up Experiment of the Process Using Fermentor (14 L)

293 cells were resuscitated in three T225 cell culture flasks (Corning, catalog number: 431082), expanded and cultured with DMEM medium containing 10% calf serum, and were inoculated into three 10-layer cell factories (Corning, "CellSTACK Chamber, 10 STACK, POLYSTYRENE, STERILE, 1/6", total area of the three 10-layer cell factories: 6360*3-19080 cm²) when the cell confluence was 80%-90%. The cells were digested to prepare a cell suspension after being cultured in a $CO_2$ incubator for about 72 hours. The cell suspension was used to inoculate into a cell fermentor (purchased from Eppendorf, BioFlo 320, the surface area of the 14 L cell fermentor was about 450,000 cm²) with an inoculation volume of 1400 ml and a total number of cells of $3.19 \times 10^9$. The cells were cultured by perfusion and were infected with vaccinia viruses at a MOI=0.05 after 6-8 days. About 72 hours after the infection with the viruses, the cells were lysed and the viruses were harvested in situ with the treatment solution. The composition of the treatment solution was 1 mM Tris, 0.03% recombinant trypsin, 5U/ml nuclease, pH 9.3, and added with 1 mM $MgCl_2$. The total amount of the treatment solution was about 50 L (about 110 μl/cm² cells). $1.24 \times 10^{12}$ PFU/fermentor of viruses (the yield per unit area was: $2.76 \times 10^6$ PFU/cm²) can be harvested.

It can be seen from the above-mentioned Examples that the method and the treatment solution for harvesting of the present invention can greatly simplify the producing process and is particularly suitable for large-scale production of viruses. By adopting the method and the treatment solution for harvesting of the present invention, the yield of the viruses harvested is high and the impurity is low, which further facilitates the subsequent purification process to be implemented and makes the purity and biological activity of the obtained viruses higher.

It can be understood that the above embodiments are merely exemplary implementations used to illustrate the principle of the present invention, but the present invention is not limited thereto. For those skilled in the art, various variations and modifications can be made without departing from the spirit and essence of the present invention, and these variations and modifications are also within the protection scope of the present invention.

What is claimed is:

1. A method of producing a virus, comprising:
   culturing cells, wherein the cells have been inoculated with viruses or have been transfected with viral packaging elements; and
   contacting the cultured cells with a harvesting solution composition to harvest the viruses in a single step, wherein the harvesting solution composition comprises a trypsin, a pH buffer, and, optionally, a nuclease, and wherein the pH of the harvesting solution composition is in a range of greater than 7.5 and no more than 10.5, optionally in a range of 8.5-9.5, and optionally the pH buffer is selected from a Tris buffer and a sodium bicarbonate buffer.

2. The method according to claim 1, wherein the concentration of the trypsin in the harvesting solution composition is in a range of 0.01-0.12% (w/v), optionally in a range of 0.03-0.06% (w/v).

3. The method according to claim 1, wherein the concentration of the nuclease in the harvesting solution composition is in a range of 1-100 IU/ml, optionally in a range of 1-50 IU/ml, and more-optionally in a range of 1-5 IU/ml.

4. The method according to claim 1, wherein the osmotic pressure of the harvesting solution composition is in a range of 0-50 mOsmol/kg or 800-2500 mOsmol/kg, optionally in a range of 0-20 mOsmol/kg or 1785-2000 mOsmol/kg, and optionally in a range of 1-20 mOsmol/kg.

5. The method according to claim 1, wherein the culture is carried out in a cell flask, a cell factory or a fermentor, and the culture includes adherent culture and suspension culture.

6. The method according to claim 1, wherein when the culture is an adherent culture, the amount of the harvesting solution composition is in a range of greater than or equal to 35 μl of the harvesting solution composition/cm² cells, optionally in a range of greater than or equal to 70 μl of the harvesting solution composition/cm² cells; and
   wherein when the culture is a suspension culture, the amount of the harvesting solution composition is in a range of greater than or equal to 35 μl of the harvesting solution composition/$10^5$ cells, optionally in a range of greater than or equal to 70 μl of the harvesting solution composition/$10^5$ cells.

7. The method according to claim 1, wherein the method comprises contacting the cultured cells with the harvesting solution composition for a time range of 5-60 minutes.

8. The method according to claim 1, wherein the cells are selected from Vero cells, 293 cells, CEF cells, and Hela cells.

9. The method according to claim 1, wherein the virus is selected from vaccinia virus, varicella-zoster virus, rotavirus, EV71 virus, hepatitis A virus, herpes simplex virus, lentivirus, retrovirus, adenovirus, adenovirus-associated virus, measles virus, Semliki Forest virus, vesicular stomatitis virus, poliovirus, reovirus, Seneca valley virus, Echo enterovirus, Coxsackie virus, Newcastle disease virus and Maraba virus, and optionally enveloped virus.

10. The method according to claim 1, wherein the cells are 293 cells, and the viruses are vaccinia viruses.

11. The method according to claim 1, wherein the harvesting solution composition comprises a Tris buffer, a trypsin and a nuclease, and the concentration of the Tris buffer is in a range of 1-50 mM, and optionally in a range of 1-10 mM.

12. A harvesting solution composition for harvesting viruses subjected to cell culture, wherein the harvesting solution composition comprises a trypsin, a pH buffer, and, optionally, a nuclease, and
wherein the pH of the harvesting solution composition is in a range of greater than 7.5 and no more than 10.5, optionally in a range of 8.5-9.5, and optionally the pH buffer is selected from a Tris buffer and a sodium bicarbonate buffer.

13. The harvesting solution composition according to claim 12, wherein the concentration of the trypsin in the harvesting solution composition is in a range of 0.01-0.12% (w/v), optionally in a range of 0.03-0.06% (w/v).

14. The harvesting solution composition according to claim 12, wherein the concentration of the nuclease in the harvesting solution composition is in a range of 1-100 IU/ml, optionally in a range of 1-50 IU/ml, and optionally in a range of 1-5 IU/ml.

15. The harvesting solution composition according to claim 12, wherein the osmotic pressure of the harvesting solution composition is in a range of 0-50 mOsmol/kg or 800-2500 mOsmol/kg, optionally in a range of 0-20 mOsmol/kg or 1785-2000 mOsmol/kg, optionally in a range of 1-20 mOsmol/kg.

16. The harvesting solution composition according to claim 12, wherein the culture is carried out in a cell flask, a cell factory or a fermentor, and the culture includes adherent culture and suspension culture.

17. The harvesting solution composition according to claim 12, wherein the cells are selected from Vero cells, 293 cells, CEF cells, and HeLa cells.

18. The harvesting solution composition according to claim 12, wherein the virus is selected from vaccinia virus, varicella-zoster virus, rotavirus, EV71 virus, hepatitis A virus, herpes simplex virus, lentivirus, retrovirus, adenovirus, adenovirus-associated virus, measles virus, Semliki Forest virus, vesicular stomatitis virus, poliovirus, reovirus, Seneca valley virus, Echo enterovirus, Coxsackie virus, Newcastle disease virus and Maraba virus, and optionally enveloped virus.

19. The harvesting solution composition according to claim 12, wherein the cells are 293 cells, and the viruses are vaccinia viruses.

20. The harvesting solution composition according to claim 12, wherein the harvesting solution composition comprises a Tris buffer, a trypsin, and a nuclease, and the concentration of the Tris buffer is in a range of 1-50 mM, and optionally in a range of 1-10 mM.

* * * * *